May 6, 1952 G. E. ADAMS 2,595,320
LOADING AND UNLOADING UNIT FOR LIFT TRUCKS
Filed Feb. 17, 1950 2 SHEETS—SHEET 1
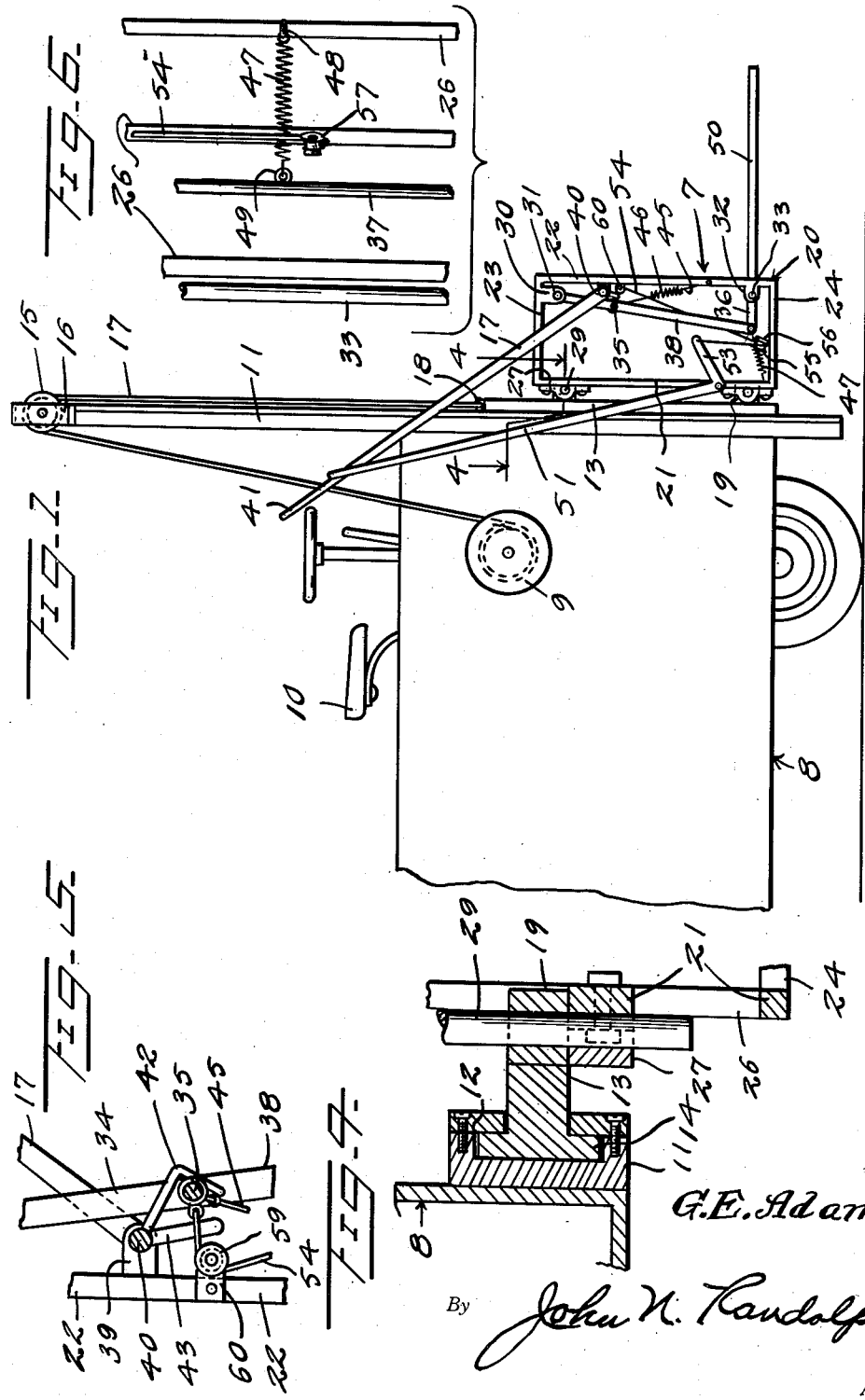
Inventor
G.E. Adams
By John N. Randolph
Attorney May 6, 1952 G. E. ADAMS 2,595,320
LOADING AND UNLOADING UNIT FOR LIFT TRUCKS
Filed Feb. 17, 1950 2 SHEETS—SHEET 2
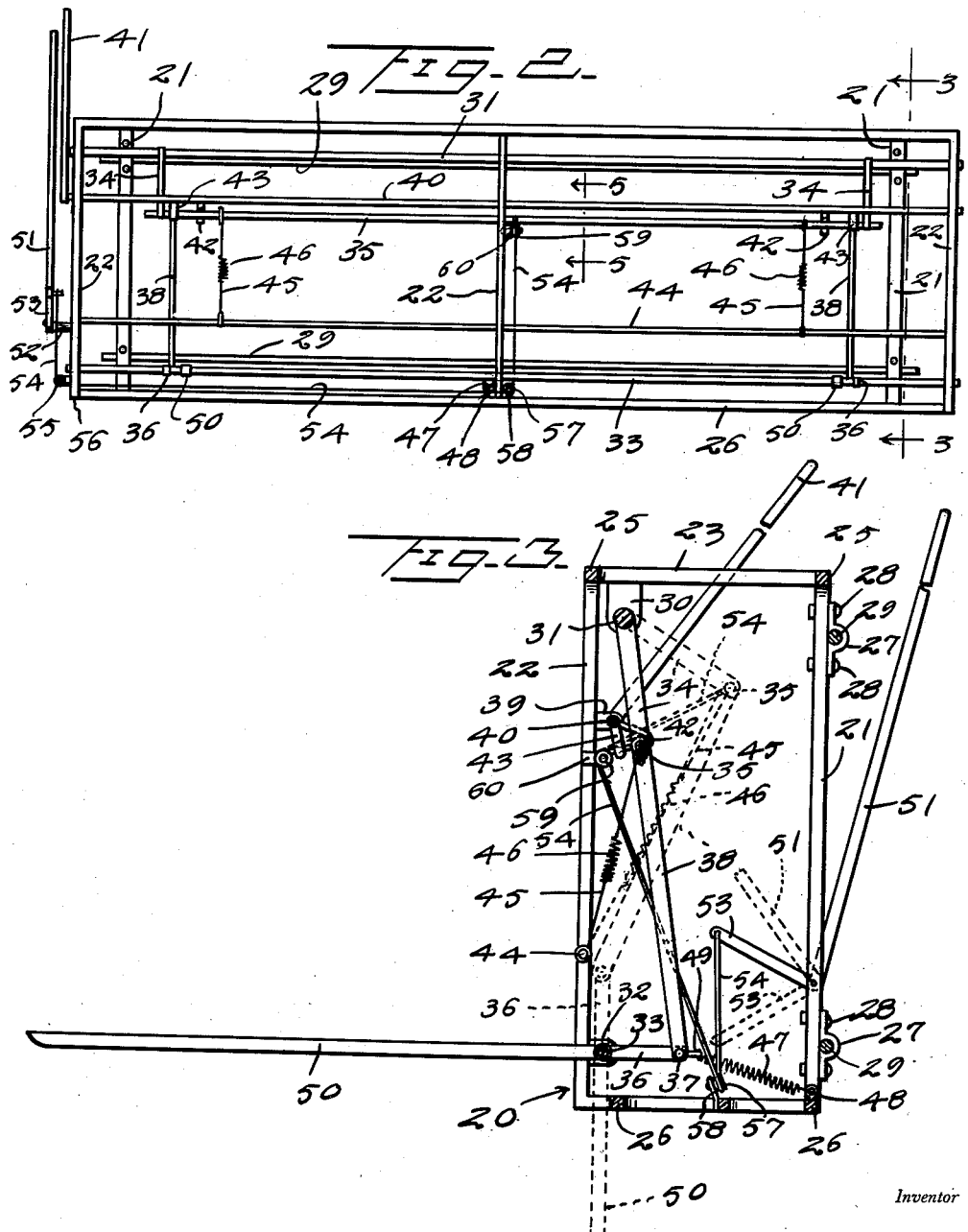
Inventor
G. E. Adams
By John N. Randolph
Attorney Patented May 6, 1952

2,595,320

UNITED STATES PATENT OFFICE 2,595,320

LOADING AND UNLOADING UNIT FOR LIFT TRUCKS

Grover E. Adams, Vermont, Ill.

Application February 17, 1950, Serial No. 144,736

5 Claims. (Cl. 214—113)

This invention relates to a novel loading and unloading unit for use with wheeled load conveyors or lift trucks such as are conventionally employed for loading and unloading freight cars, trucks or the like and which conveyors are conventionally equipped with an elevator or hoist structure for raising and lowering the load supporting element or platform.

More particularly, it is a primary object of the present invention to provide a device by means of which heavy articles to be loaded, conveyed and unloaded may be positioned on the loading and unloading attachment, raised or lowered relatively to a supporting surface of the truck or wheeled conveyor, transported and subsequently unloaded at a desired location at a level above or below the level at which the load was picked up and without the operator of the truck or wheeled conveyor leaving his position on the operator's seat and without requiring any manual handling or lifting of the load.

Various other objects and advantages of the invention will hereinafter become more fully apparent from the following description of the drawings, illustrating a presently preferred embodiment thereof, and wherein:

Figure 1 is a side elevational view showing the forward portion of a conventional lift truck used for loading or unloading box cars, trucks or the like, and showing the invention mounted thereon and disposed in an operative, load supporting position;

Figure 2 is a front elevational view of the loading and unloading unit shown detached from the truck or conveyor;

Figure 3 is a cross sectional view thereof taken substantially along a plane as indicated by the line 3—3 of Figure 2 and on an enlarged scale;

Figure 4 is an enlarged horizontal sectional view, taken substantially along a plane as indicated by the line 4—4 of Figure 1;

Figure 5 is an enlarged transverse vertical sectional view taken substantially along a plane as indicated by the line 5—5 of Figure 2, and Figure 6 is an enlarged fragmentary plan view of a portion of the loading and unloading apparatus.

Referring more specifically to the drawings, for the purpose of illustrating a preferred application and use of the loading and unloading device, designated generally 7 and comprising the invention, the front end of a lift truck with which the apparatus 7 is adapted to be employed is illustrated in Figure 1 and designated generally 8. The truck 8 is provided with a prime mover, not shown, by which it is propelled and is equipped with a driven winch 9 which is suitably controlled by the operator of the truck 8 from the operator's seat 10 for revolving the winch 9 in either direction. The truck 8 is provided at its forward end with two upright rails 11 which are fixed thereto in laterally spaced relationship and which extend preferably from adjacent the supporting surface of the truck 8 to a level above the top of the truck. Each rail 11 is provided with an outwardly opening groove preferably of substantially T-shaped cross section as seen at 12 in Figure 4. A carriage 13 is provided with a plurality, preferably four laterally projecting T-shaped slides 14, two of which slidably engage each of the rail grooves 12. A pulley 15 is journalled in a crosshead 16 secured to the upper ends of the rails 11 and has a cable or other flexible member 17 trained thereover, one end of which is fixed to and wound on the winch 9 and the opposite end of which is anchored to an eye 18 which projects from the upper end of the frame 13. The frame 13 is provided with four apertured ears 19 which project outwardly therefrom away from the slides 14. The parts 8 to 19, constitute no part of the present invention and have been illustrated and briefly described merely to illustrate the application and use of the loading and unloading attachment 7 which constitutes the invention.

The attachment 7 includes a relatively long frame, designated generally 20 which is preferably formed of angle iron and which is disposed transversely of the truck 8 and which includes rear uprights 21, front uprights 22, forwardly and rearwardly extending top and bottom members 23 and 24, respectively, longitudinally extending top members 25, as seen in Figure 3, and a plurality of longitudinally extending bottom members 26. Two of the rear uprights 21, each adjacent its upper and lower end is provided with brackets 27 which are fastened to the outer sides thereof by fastenings 28 and which brackets define apertures or eyes to align with the apertures of the ears 19 for receiving pins or rods 29 which extend through said aligned apertures, as best seen in Figure 4, for mounting the frame 20 on the carriage 13.

Each end member 23 is provided with a depending hanger 30, located adjacent the front of the frame 20. A rod or shaft 31 extends longitudinally of the upper front portion of the frame 20 and is journalled at its ends in the hangers 30. A bracket 32 is fixed to and projects rearwardly from each end upright 22, near its lower end and a rod or shaft 33 extends longitudinally of the frame 20 and is journalled at its ends in said brackets 32. A plurality, preferably two levers 34 are fixed to and normally extend downwardly from the shaft 31, one adjacent each end of the frame 20 and said levers at their lower ends are journalled on a rod 35 which extends longitudinally of the frame 20. A pair of levers 36 are secured to the lower shaft 33, one near each end thereof and said levers normally extend rearwardly of the frame 20 and are journalled at their rear ends on a rod 37 which extends longitudinally of the frame 20. A pair of rigid link members 38 extend between the rods 35 and 37 and are journalled at their ends on each of said rods. A pair of brackets 39 are connected one to each of the end uprights 22 and extend rearwardly therefrom and are apertured to journal the ends of a shaft 40 which extends beyond the right-hand end of the frame 20, looking from rear to front thereof and to which is secured a lever 41 which extends upwardly and rearwardly from the right-hand side of the frame 20 to adjacent the driver's seat 10, as seen in Figure 1. The shaft 40 has fixed thereto two rearwardly extending down-turned hooks 42 and two downwardly extending arms 43 which are disposed forwardly of the hooks 42. A rod 44 is fixed at its ends to and extends between the front uprights 22 and provides an anchor for the lower ends of two flexible members 45 which extend upwardly therefrom and are connected at their upper ends to the rod 35 and each of which is provided with a resilient intermediate portion provided by a contractile coiled spring 46 for rendering the flexible members 45 elastic. A contractile coiled spring 47 is anchored at one of its ends to an eye member 48 which is secured to the bottom rear portion of the frame 20 and is secured at its opposite end to an apertured ear 49 which projects from the rod 37.

Two or more load supporting arms 50 are secured to the shaft 33 in line with the levers 36 and normally extend forwardly from the frame 20 in substantially a horizontal plane. A lever 51 is journalled on a stub shaft 52 which extends from the right-hand side of the frame 20 behind and beneath the journal of the lever 41 and said lever 51 likewise normally extends upwardly and rearwardly to adjacent the operator's seat, as illustrated in Figure 1. A shorter lever 53 which may form an angular extension of the pivoted end of the lever 51 extends generally in a forward direction from the stub shaft 52 and has one end of a cable 54 secured to its free end. The cable 54 extends downwardly from the lever 53 under a pulley 55 which is supported on the frame 20 by a bracket 56 and thence longitudinally of the frame toward its intermediate portion where the flexible member 54 is trained under a second pulley 57 which is mounted on the frame by a bracket 58. The flexible member 54 extends upwardly from said second pulley 57 around the forward side of a pulley 59, as seen in Figure 3, which is mounted by a bracket 60 on the front part of the frame 20. The flexible member 54 then extends rearwardly from the pulley 59 and is secured at its opposite end to the rod 35.

From the foregoing it will be readily apparent that by operation of the winch 9 the unloading attachment 7 may be raised or lowered relatively to the truck 8. With the parts of the attachment 7 in their positions of Figure 1 and as seen in full lines in Figure 3, the load supporting members 50 are retained in horizontal positions due to the fact that the links 34 and 38 are disposed in alignment so that the upward force exerted on the links 34 and 38 by the weight of the load, not shown, borne by the elements 50 will be transmitted directly to the shaft 31. To positively prevent the links 34 and 38 from breaking at their pivots 35, the lever 41 is disposed in the position as illustrated in Figures 1 and 3 so that the hooks 42 will engage behind the rod 35 to prevent the rod from moving rearwardly of the frame 20 or from left to right, as seen in Figure 3. After the load has been conveyed and is disposed in a position to be unloaded, the winch 9 is actuated to move the attachment 7 so that the supporting elements 50 will be disposed above but adjacent the surface onto which the load is to be placed. The operator from his position on the truck 8 then manually swings the lever 41 forwardly to initially swing the hooks 42 out of engagement with the rod 35 and to thereafter swing the arms 43 into engagement with said rod 35 so that the arms 43 will displace the rod 35 rearwardly from its full line position of Figure 3 to move the links 34 and 38 out of a straight line position. As soon as this occurs, the weight of the load on the elements 50 will cause said elements to swing downwardly and if the elements 50 are disposed adjacent the surface on which the load is to be placed, said elements 50 may initially be supported by said surface at an incline so that the load may slide off of the elements 50 onto said surface or the truck 8 may be backed for withdrawing the elements 50 from beneath the load as it is placed on the surface. If desired, where the load is of a character where it is intended and adapted to be dumped, the frame 20 may be disposed in an elevated position so that when the pivot rod 35 is displaced rearwardly the weight of the load will cause the elements 50 to swing downwardly to their dotted line positions of Figure 3, thereby dropping the load therefrom and causing the levers 34 and 36 and the links 38 to assume their dotted line positions of Figure 3. The spring 46 and the spring 47 will resist the downward swinging movement of the load supporting elements 50 toward their dotted line positions of Figure 3 so that after the load is released therefrom said springs will tend to return the levers and links 34, 36 and 38 to their full line positions of Figure 3 preparatory to the elements 50 engaging another load to be transported. However, to insure that the parts will be fully returned to their full line positions of Figure 3 the cable 54 and operating levers 51 and 53 are provided so that the operator of the truck from his position thereon may manually swing the lever 51 rearwardly for exerting a pull on the cable 54 to displace the rod 35 forwardly and positively return it to its full line position of Figure 3, after which the lever 41 may be swung rearwardly to engage the hooks 42 behind the rod 35 to retain the parts in their full line positions of Figure 3. It will be readily obvious that the load engaging elements may be raised or lowered with the frame 20 so as to slide along a platform, car or truck bed to engage under a load to be conveyed thereby and when disposed thereunder, the attachment 7 may be elevated by operation of the winch 9 and the supported load then conveyed to a position to be unloaded.

Various modifications and changes are contemplated and may obviously be resorted to, without departing from the spirit or scope of the invention as hereinafter defined by the appended claims.

I claim as my invention:

1. A loading and unloading attachment for a lift truck comprising, in combination with a self-propelled lift truck having a vertically movable driven elevator means at one end thereof, a loading and unloading attachment comprising a frame connected to and supported by said elevator means and extending transversely of the lift truck, a shaft journalled in said frame adjacent its bottom, a plurality of load supporting elements fixed to said shaft and projecting therefrom outwardly of the frame and in a direction away from the lift truck, when said load supporting elements are in a load supporting position, a plurality of first lever members fixed to said shaft and projecting laterally therefrom in a direction away from said load supporting elements, a second shaft journalled in the frame above said first shaft, a plurality of second lever members fixed to said second shaft and extending therefrom at an angle to the first lever members, a plurality of rigid connecting links pivotally connected at their ends to the free ends of the first and second lever members, said links and the second lever members being disposed in alignment when the load supporting elements are in raised, load supporting positions for maintaining the load supporting elements in their load supporting positions, a first manually actuated means operable to initially engage the pivot of the second lever members and links for displacing said pivot inwardly of the frame and toward the lift truck whereby said load supporting elements are released to swing downwardly in response to the load supported thereby toward depending positions for releasing the load therefrom, a second manually actuated means connected to the pivot of the second lever members and links for displacing said pivot in the opposite direction or outwardly of the frame to return the links and levers to their initial positions and the load supporting elements to their raised, operative positions, and spring means anchored to the frame and connected to each of the link and lever pivots to resist the swinging movement of the load supporting members toward load releasing positions and to return said load supporting members to load supporting positions and the links and levers to their first mentioned positions.

2. A loading and unloading attachment for a lift truck comprising, in combination with a self-propelled lift truck having a vertically movable driven elevator means at one end thereof, a loading and unloading attachment comprising a frame connected to and supported by said elevator means and extending transversely of the lift truck, a shaft journalled in said frame adjacent its bottom, a plurality of load supporting elements fixed to said shaft and projecting therefrom outwardly of the frame and in a direction away from the lift truck, when said load supporting elements are in a load supporting position, a plurality of first lever members fixed to said shaft and projecting laterally therefrom in a direction away from said load supporting elements, a second shaft journalled in the frame above said first shaft, a plurality of second lever members fixed to said second shaft and extending therefrom at an angle to the first lever members, a plurality of rigid connecting links pivotally connected at their ends to the free ends of the first and second lever members, said links and the second lever members being disposed in alignment when the load supporting elements are in raised, load supporting positions for maintaining the load supporting elements in their load supporting positions, a first manually actuated means operable to initially engage the pivot of the second lever members and links for displacing said pivot inwardly of the frame and toward the lift truck whereby said load supporting elements are released to swing downwardly in response to the load supported thereby toward depending positions for releasing the load therefrom, a second manually actuated means connected to the pivot of the second lever members and links for displacing said pivot in the opposite direction or outwardly of the frame to return the links and levers to their initial positions and the load supporting elements to their raised, operative positions, and a hook secured to said first manually operated means to engage the pivot of the second lever members and link members to retain said link and lever members in their first positions and the load supporting elements in their load supporting positions.

3. A loading and unloading attachment for a lift truck comprising, in combination with a self-propelled lift truck having a vertically movable driven elevator means at one end thereof, a loading and unloading attachment comprising a frame connected to and supported by said elevator means and extending transversely of the lift truck, a shaft journalled in said frame adjacent its bottom, a plurality of load supporting elements fixed to said shaft and projecting therefrom outwardly of the frame and in a direction away from the lift truck, when said load supporting elements are in a load supporting position, a plurality of first lever members fixed to said shaft and projecting laterally therefrom in a direction away from said load supporting elements, a second shaft journalled in the frame above said first shaft, a plurality of second lever members fixed to said second shaft and extending therefrom at an angle to the first lever members, a plurality of rigid connecting links pivotally connected at their ends to the free ends of the first and second lever members, said links and the second lever members being disposed in alignment when the load supporting elements are in raised, load supporting positions for maintaining the load supporting elements in their load supporting positions, a first manually actuated means operable to initially engage the pivot of the second lever members and links for displacing said pivot inwardly of the frame and toward the lift truck whereby said load supporting elements are released to swing downwardly in response to the load supported thereby toward depending positions for releasing the load therefrom, a second manually actuated means connected to the pivot of the second lever members and links for displacing said pivot in the opposite direction or outwardly of the frame to return the links and levers to their initial positions and the load supporting elements to their raised, operative positions, spring means anchored to the frame and connected to each of the link and lever pivots to resist the swinging movement of the load supporting members toward load releasing positions and to return said load supporting members to load supporting positions and the links and levers to their first mentioned positions, and a hook secured to said first manually operated means to engage the pivot of the second lever members and link members to retain said link and lever members in their first positions and the load supporting elements in their load supporting positions.

4. A loading and unloading attachment for a lift truck comprising, in combination with a self-propelled lift truck having a vertically movable driven elevator means at one end thereof, a loading and unloading attachment comprising a frame connected to and supported by said elevator means and extending transversely of the lift truck, a shaft journalled in said frame adjacent its bottom, a plurality of load supporting elements fixed to said shaft and projecting therefrom outwardly of the frame and in a direction away from the lift truck, when said load supporting elements are in a load supporting position, a plurality of first lever members fixed to said shaft and projecting laterally therefrom in a direction away from said load supporting elements, a second shaft journalled in the frame above said first shaft, a plurality of second lever members fixed to said second shaft and extending therefrom at an angle to the first lever members, a plurality of rigid connecting links pivotally connected at their ends to the free ends of the first and second lever members, said links and the second lever members being disposed in alignment when the load supporting elements are in raised, load supporting positions for maintaining the load supporting elements in their load supporting positions, a first manually actuated means operable to initially engage the pivot of the second lever members and links for displacing said pivot inwardly of the frame and toward the lift truck whereby said load supporting elements are released to swing downwardly in response to the load supported thereby toward depending positions for releasing the load therefrom, a second manually actuated means connected to the pivot of the second lever members and links for displacing said pivot in the opposite direction or outwardly of the frame to return the links and levers to their initial positions and the load supporting elements to their raised, operative positions, the pivots of the lever members and link members comprising rods extending longitudinally of the frame and on which the free ends of the lever members and the ends of the link members are journalled, said first manually operated means comprising a shaft journalled in the frame and extending longitudinally thereof, a manually actuated lever fixed to one end of the shaft and disposed beyond one end of the frame and adapted to be manually operated from the operator's position on the lift truck for turning the last mentioned shaft, and an arm fixed to said last mentioned shaft and swingable therewith into engagement with the rod on which the second lever members are journalled for displacing said rod inwardly of the frame when said last mentioned shaft is rotated in one direction.

5. A loading and unloading attachment as in claim 4, and a hook fixed to the last mentioned shaft at an angle to said arm to engage the rod on which the second lever members are journaled to retain said rod in position to hold the links and second lever members in alignment, said hook being displaced out of engagement with said rod as the arm is swung toward said rod.

GROVER E. ADAMS.

REFERENCES CITED

The following references are of record in the file of this patent:

UNITED STATES PATENTS

| Number | Name | Date |
| --- | --- | --- |
| 1,860,222 | Billings | May 24, 1932 |
| 1,914,118 | Golrick et al. | June 13, 1933 |
| 2,402,071 | Nehring | June 11, 1946 |
| 2,426,687 | Henry | Sept. 2, 1947 |
| 2,437,007 | Thorns | Mar. 2, 1948 |
| 2,437,010 | Way | Mar. 2, 1948 |
| 2,469,187 | Warnock et al. | May 3, 1949 |